US012744866B2

(12) United States Patent
Moskovchenko et al.

(10) Patent No.: US 12,744,866 B2
(45) Date of Patent: Sep. 22, 2026

(54) SYSTEMS AND METHODS FOR SWITCHING OF VIDEO STREAMS PROVIDED TO A GROUND STATION FROM VARIOUS SOURCES ONBOARD AN UNMANNED AERIAL VEHICLE

(71) Applicant: Skydio, Inc., San Mateo, CA (US)

(72) Inventors: Stepan Moskovchenko, Belmont, CA (US); Jerry Feng, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 266 days.

(21) Appl. No.: 18/522,754

(22) Filed: Nov. 29, 2023

(65) Prior Publication Data

US 2024/0179275 A1 May 30, 2024

Related U.S. Application Data

(60) Provisional application No. 63/385,256, filed on Nov. 29, 2022.

(51) Int. Cl.
*H04N 7/18* (2006.01)
*B64U 101/00* (2023.01)
(Continued)

(52) U.S. Cl.
CPC ............. *H04N 7/185* (2013.01); *G06V 10/95* (2022.01); *G06V 20/17* (2022.01); *G06V 20/46* (2022.01);
(Continued)

(58) Field of Classification Search
CPC .... H04N 7/185; H04N 7/035; H04N 21/2187; H04N 21/23418; H04N 21/23424;
(Continued)

(56) References Cited

U.S. PATENT DOCUMENTS 8,457,468 B2 * 6/2013 Chen ...................... H04N 19/00 386/326
2014/0059166 A1 2/2014 Mann et al.
(Continued)

FOREIGN PATENT DOCUMENTS

CN 102428703 B 12/2015
CN 111279640 A 6/2020
(Continued)

*Primary Examiner* — Bobbak Safaipour

(57) ABSTRACT

Systems, methods, and software for operating an unmanned aerial vehicle (UAV) having one or more camera sensors. A method includes capturing a video stream using the camera sensor(s) of the UAV. The method includes determining a capability of a ground station communicably coupled to the UAV to annotate the video stream. In response to determining that the ground station is capable to annotate the video stream, the method includes transmitting the video stream to the ground station without annotations. Alternatively, in response to determining that the ground station is incapable to annotate the video stream, drawing annotations on the video stream to generate an annotated video stream, and transmitting the annotated video stream to the ground station. Embodiments of the present technology provide enhanced interoperability between UAVs and different types of ground stations to improve streamlining and quality of user experiences as compared to conventional systems and techniques.

20 Claims, 9 Drawing Sheets

(51) Int. Cl.
*B64U 101/30* (2023.01)
*G06V 10/94* (2022.01)
*G06V 20/17* (2022.01)
*G06V 20/40* (2022.01)
*H04N 7/035* (2006.01)

(52) U.S. Cl.
CPC ......... *H04N 7/035* (2013.01); *B64U 2101/00* (2023.01); *B64U 2101/30* (2023.01)

(58) Field of Classification Search
CPC .. H04N 21/23614; G06V 10/95; G06V 20/17; G06V 20/46; B64U 2101/00; B64U 2101/30; B64U 10/13
See application file for complete search history.

(56) References Cited

U.S. PATENT DOCUMENTS

| | | | | |
|---|---|---|---|---|
| 2014/0267723 | A1* | 9/2014 | Davidson, Jr. | G06T 17/05 345/632 |
| 2014/0366057 | A1* | 12/2014 | Brockmann | H04N 21/4316 725/37 |
| 2020/0106818 | A1* | 4/2020 | Luong | H04L 67/12 |
| 2024/0179329 | A1* | 5/2024 | Moskovchenko | H04N 19/33 |
| 2024/0179410 | A1* | 5/2024 | Moskovchenko | H04N 23/6815 |

FOREIGN PATENT DOCUMENTS

| | | | |
|---|---|---|---|
| CN | 114500727 | A | 5/2022 |
| CN | 116170587 | A | 5/2023 |
| WO | 2016139604 | A1 | 9/2016 |

* cited by examiner

100
J
FROM FIG. 3D
MONITOR FRAME STRUCTURE OF ENCODED ANNOTATED VIDEO STREAM
142
DETERMINE PRESENCE OF I-FRAME IN ENCODED ANNOTATED VIDEO STREAM
144
I-FRAME DETERMINED?
145
NO
YES
TO FIG. 3D
K

100
L
FROM FIG. 3A
STITCH TOGETHER UNENCODED VIDEO STREAMS FROM NAVIGATIONAL CAMERAS
146
148
ENCODE UNENCODED STITCHED VIDEO STREAM
TRANSMIT ENCODED STITCHED VIDEO STREAM TO GROUND STATION
149
TO FIG. 3H
M

SYSTEMS AND METHODS FOR SWITCHING OF VIDEO STREAMS PROVIDED TO A GROUND STATION FROM VARIOUS SOURCES ONBOARD AN UNMANNED AERIAL VEHICLE

CROSS-REFERENCE TO RELATED APPLICATIONS

This application claims priority to and benefit of U.S. Provisional Patent Application Ser. No. 63/385,256, filed Nov. 29, 2022, and entitled "Systems And Methods For Switching Of Video Streams Provided To A Ground Station From Various Sources Onboard An Unmanned Aerial Vehicle," the contents of which are expressly incorporated by reference in its entirety for all purposes herein. This application is related to co-pending U.S. Patent Application No. 18/522,913, which claims priority and benefit to U.S. Provisional Patent Application Ser. No. 63/385,315, filed Nov. 29, 2022, and entitled "Systems And Methods For Adapting Unmanned Aerial Vehicle Video Stream Quality to Wireless Connection Quality with Ground Station," filed on the same day as this application, the contents of which are expressly incorporated by reference herein.

TECHNICAL FIELD

Various implementations of the present technology relate to unmanned aerial vehicles (UAVs) and, in particular, to task management of unmanned aerial vehicles.

BACKGROUND

Unmanned aerial vehicles (UAVs, a.k.a. drones) find uses in a variety of applications by a variety of private, commercial and government users. At least some known UAV systems and associated operational techniques require a specifically configured ground station for piloting a UAV and implementing various other related operations such as viewing still, or video imaging obtained by the UAV during flight. Use of other ground station systems besides the particularly designed designs for a particular UAV can be cumbersome, if not impossible. Although it may be possible to design and build a ground station for a particular type or model of UAV other than the intended ground station, user experience may suffer in ways like command responsiveness and video quality.

Accordingly, a need exists for technology that overcomes the problems demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

The present technology provides systems, methods, and software for operating an unmanned aerial vehicle (UAV) having one or more camera sensors. A first aspect of the disclosure provides a method for operating a UAV. The method includes capturing a video stream using the camera sensor(s) of the UAV. The method includes determining a capability of a ground station communicably coupled to the UAV to annotate the video stream. In response to determining that the ground station is capable to annotate the video stream, the method includes transmitting the video stream to the ground station without annotations. Alternatively, in response to determining that the ground station is incapable to annotate the video stream, drawing annotations on the video stream to generate an annotated video stream, and transmitting the annotated video stream to the ground station.

A second aspect of the disclosure provides a UAV system. The system includes one or more camera sensors for capturing a video stream. The system includes at least one computing device disposed onboard the UAV and operably coupled to the one or more camera sensors. The at least one computing device determines a capability of a ground station communicably coupled with the UAV to annotate the video stream. In response to the ground station being determined to be capable of annotating the video stream, the at least one computing system causes the video stream to be transmitted to the ground station without annotations. Alternatively, in response to the ground station being determined to be incapable of annotating the video stream, the at least one computing device draws annotations on the video stream to generate an annotated video stream, and causes the annotated video stream to be transmitted to the ground station.

A third aspect of the disclosure provides one or more non-transitory computer readable media. The one or more non-transitory computer readable media has stored thereon program instructions which, when executed by at least one processor, cause a UAV to determine a capability of a ground station in communication with the UAV to annotate a video stream captured by one or more camera sensors of the UAV. When executed by the at least one processor in response to the ground station being determined to be capable of annotating the video stream, the program instructions cause the UAV to direct a communications interface to transmit the video stream to the ground station without annotations. Alternatively, when executed by the at least one processor in response to the ground station being determined to be incapable of annotating the video stream, the program instructions cause the UAV to draw annotations on the video stream to generate an annotated video stream, and direct the communications interface to transmit the annotated video stream to the ground station.

Embodiments of the present technology provide enhanced interoperability between UAVs and different types of ground stations to improve streamlining and quality of user experiences as compared to conventional systems and techniques. Examples of embodiments of the present technology are provided and described in the Detailed Description with reference to the Drawings.

BRIEF DESCRIPTION OF THE DRAWINGS

One or more embodiments of the present invention are illustrated by way of example and not limitation in the figures of the accompanying drawings, wherein alphanumeric labels correspond to their mention in the Detailed Description.

Figure 1:
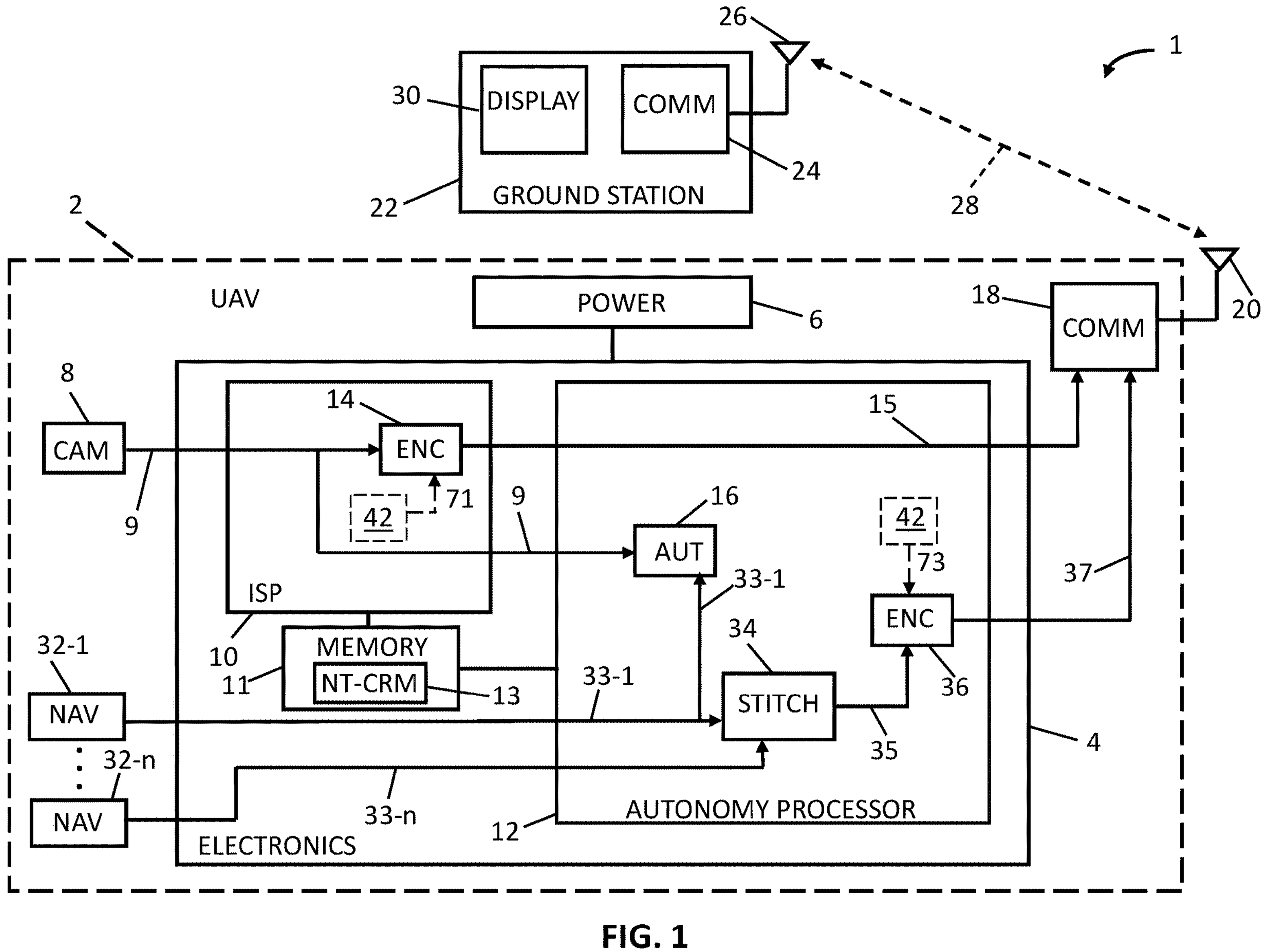
FIG. 1 depicts a block diagram of an unmanned aerial vehicle (UAV) system in accordance with some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to “one embodiment” or “an embodiment” means that a particular feature, structure, or characteristic described in connection with the embodiment is included in at least one embodiment of the disclosure. The appearances of the phrase “in one embodiment” in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, computing processes and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

This present disclosure describes computing, communication and data storage systems, methods, and software for switching of video streams provided to a ground station from various sources onboard an unmanned aerial vehicle (UAV). The embodiments of the present disclosure improve upon, and provide unique technical benefits to, technology fields including UAV-related systems and methods of operation involving image processing of video streams from onboard camera sensors. The various technical benefits and effects of the disclosed embodiments are implemented specifically and exclusively in specialized computing, communication and data storage devices and systems. Although some such devices and their interconnections may be known to persons of ordinary skill in the art, their configuration and use as described herein provide an advantageous contribution both to the technical problem of switching between two or more sources of unannotated and annotated video streams to be transmitted to a UAV ground station with minimal, or no, detrimental impact on user experience, according to the disclosed embodiments.

As will become apparent to persons skilled in the art, the disclosed embodiments are not merely process steps capable of being performed using generic computing devices, but which could be performed mentally or otherwise by a human being, including with the aid of pen and paper. Rather, the unique algorithms described herein are required to be encoded in software instructions to direct (e.g., “cause”) the physical actions of the various computing, communications and data storage devices in a manner believed to be as yet unknown in the pertinent technological field. These physical effects and actions include, without limitation, transmission of encoded data as signals over wired or wireless communication channels, both within one particular computing device and over great distances over spans of the Earth or outer space. The described algorithms direct data to be stored according to received data inputs originating from camera sensors of the UAV and from a ground station utilized for piloting the UAV, among other purposes. All of these actions, and numerous others that are described herein, are performed by physical computing and communication devices, as directed by the disclosed algorithms. Furthermore, the physical actions which are specifically caused to occur using computing devices having processors taking as commands encoded software or firmware instructions stored in non-transient computer-readable storage media are performed and coordinated thereby in substantially real-time. Real-time is defined as a very nearly instantaneous result of an input, stimulus, or computation performed by a computing device as described herein, where the timing of a subsequent action is limited only by the physical makeup or design of the computing device and communications network. For example, a duration between a time upon which a result of a first computation is generated by a first networked computing device a time between that result becomes available for a subsequent computation by a second networked computing device may be limited only by a transmission time required by the physical medium of the wired, optical or wireless network connecting the first and second computing devices. A person having ordinary skill in the art will recognize and appreciate that not only are the disclosed algorithms incapable of being performed mentally by a human being, they are certainly not capable of being performed mentally with the aid of pen and paper in real time, or otherwise by a human being within a time sufficient to provide both the disclosed technical advantages and effects, and the improved user experience, in the practical application to the pertinent technological field.

More particularly, the disclosed embodiments enable enhanced interoperability between UAVs and different types of ground stations to improve streamlining and quality of user experiences as compared to conventional systems and techniques. As one example, the disclosed systems, methods and software for operating a UAV improve upon conventional techniques for switching between two or more sources of unannotated and annotated video streams to be transmitted to a UAV ground station, and further provide such technically advantageous improvements in the field of UAVs with minimal, or no, detrimental impact on user experience.

FIG. 1 depicts a block diagram of a UAV system 1 in accordance with some embodiments. UAV system 1 may include a UAV 2 with on-board electronics 4. UAV 2 may also include an electric power source 6, such as a rechargeable battery pack, operably coupled to electronics 4 to supply power thereto during operation of UAV 2. UAV 2 may include at least one or more camera sensors 8, such as red-green-blue (RGB) type cameras and/or infrared (IR) cameras, for obtaining still image and/or video streams during operation of UAV 2. Electronics 4 may include one or more integrated circuits having various functionality for implementing the present technology as described herein. In some embodiments, electronics 4 is essentially a single integrated circuit, while in other embodiments, electronics 4 may include a plurality of different but interconnected integrated circuits, where each integrated circuit may provide a separate, or subset of, functionality to electronics 4 for implementing the present technology. As used herein, module or modules may refer to a functional block or set of interconnected blocks of electronics 4, where such module(s) may include digital and/or analog electronic components of the wider electronics 4 of UAV 2, and which may further include computing and memory data storage devices that may be dedicated for use by specific modules, or which may be shared amongst two or more modules of electronics 4. Such structure and function of module(s) of electronics 4 according to the present technology is expected to become fully apparent to persons having ordinary skill in the art upon further study of the disclosure.

Electronics 4 may include an image signal processor (ISP) module 10 operably coupled in communication with camera sensor(s) 8. Electronics 4 may also include an autonomy processor (AP) module 12 operably coupled in communication with ISP module 10. Electronics 4 may further include at least one memory data storage device ("memory" for short) 11 operably coupled in communication with ISP module 10 and/or AP module 12. Memory 11 may be capable of storing image data including such data generated by camera sensor(s) 8. Memory 11 may be capable of permanently storing such data in a format that is readable by devices and systems operable by a user of UAV 2 that are external to UAV 2. For example, and without limitation, memory 11 may at least in part be embodied in a removable disk, such as a SECURE DIGITAL (SD) card. As another example, a user of UAV 2 may read image data from memory 11 using a wired (e.g., serial) connection such as universal serial bus (USB). Memory 11 may store configuration data for use during operation of UAV 2 according to the present technology. Memory 11 may include one or more non-transient computer readable media (NT-CRM) 13. NT-CRM 13 may have stored thereon as, for instance, software and/or firmware code in assembled and compiled form for use by computing device(s) such as processors of electronics 4 to implement, execute, or otherwise facilitate various useful operations and algorithms during operation of UAV 2 according to the present technology.

UAV 2 includes various mechanical and other electronic components like motors and associated controllers for flight. These are not shown in FIG. 1 as they exceed the scope and spirit of this disclosure. Persons having ordinary skill in the art are expected to be able to readily envision such components and their usage in conjunction with the present technology, which may find advantageous application in a wide array of types of UAVs and similar vehicles, even ground based vehicles, beyond those commercially available and in development by the Applicant.

UAV 2 may include a communications interface 18 operably coupled in communication with AP module 8. In some embodiments, communication interface 18 may include one or more radio frequency (RF) antenna(s) 20. Communication interface 18 may be embodied in an RF transceiver capable of transmitting and receiving signals encoding various types of data useful to system 1 during operation of UAV 2. In some embodiments, communication interface 18 utilizes WiFi communication protocols for its transceiver functionality. System 1 may also include a ground station 22. Ground station 22 may include a communication interface 24 for communicating, e.g., via RF antenna(s) 26 using WiFi, with UAV 2. In some embodiments, ground station 22 may also include an electronic display device 30 providing user(s) of system 1 the ability to see video from camera sensor(s) 8 in real time by way of an RF communications link 28 established between communication interface 24 and communication interface 18.

ISP module 10 may include an encoder 14. Image data, e.g., video stream 9, captured by camera sensor(s) 8 may be in luminance-bandwidth-chrominance (YUV) format. Camera sensor(s) 8 may pass video stream 9 in YUV format to encoder 14. Encoder 14 may encode YUV video stream 9 at 15 frames per second (fps) into H.264 video format at 30 fps. AP module 4 may be operably coupled in communication with ISP module 10 to take as inputs an encoded H.264 video stream 15 from encoder 14, as well as YUV video stream 9. AP module 4 may include an autonomy module 16 to receive YUV video stream 9 from camera sensor(s) 8 for further processing. Functionality of AP module 4 includes navigation of UAV 2, among other advantageous operations of UAV 2, such as detection and/or tracking of objects captured by camera sensor(s) 8 to be annotated and/or tracked, among other functions which are beyond the scope and spirit of the present disclosure.

UAV 2 may include one or more navigation camera(s) 32 operably coupled in communication with AP module 12. In some embodiments, UAV 2 may include a plurality navigational cameras 32-1, . . . , 32-*n* (e.g., n=6) situated at various positions on a hull of UAV 2 to provide a respective plurality of unencoded video streams 33-1, . . . , 33-*n* covering a 360 degree, e.g., spherical, video coverage around the hull. In an example, a bottom portion of UAV 2 hull includes 3 navigational cameras 32 and a top portion of UAV 2 hull includes another 3 navigational cameras 32.

AP module 12 may include a stitching module 34. Image data, e.g., video streams 33-1, . . . , 33-*n* captured by navigational cameras 32-1, . . . , 32-*n* may be in YUV format. Navigational cameras 32 may pass respective video streams 33 in YUV format to stitching module 34 for stitching those streams 33 together into a single unencoded stitched video stream 35. AP module 12 may also include an encoder 36. Encoder 36 may encoder YUV video stream 35 at 15 fps into an H.264 formatted video stream 37 at 30 fps.

Ground station 22 and/or a user thereof may provide input or other interaction to specify which of H.264 encoded video streams 15 or 37 is to be received and displayed to him or her via display device 30. In some embodiments, and as described in greater detail below, AP module 12 may provide annotations of various types onto frames of encoded video streams 15 or 37 prior to their being transmitted at 30 fps to ground station 22 using communication interfaces 18 and 24.

Ground station 22 may be embodied in one of several types of machines. One example ground station 22 is a smartphone running a specialized application for piloting UAV2 and viewing video therefrom. In the smartphone, or likewise field laptop, case, the application may be capable of drawing annotations as part of rendering video on display 30. As such, such annotations need not be drawn at the UAV 2 using, e.g., AP module 12. Not having to draw annotations on video at the UAV 2 may be advantageous by, for instance, reducing power consumption and lessening on-board computational, memory and bandwidth usage. In another example, ground station 22 may be embodied in a machine that is not fully, or even partially, capable of drawing annotations on video. Whereas a smartphone application may be designed to be used effectively with a specific UAV 2 as its ground station 22 including for annotations of video, a ground station 22 not having that capability may still be utilized to display video from UAV 2 to users. Enabling such other ground stations 22 to be used to pilot UAV 2 and view video therefrom is advantageous because it may expand the reach of useful applications that UAV 2 may be used for (e.g., police, military, fire, search & rescue, etc.) where smartphones with tailored applications may be unavailable.

Figure 2:
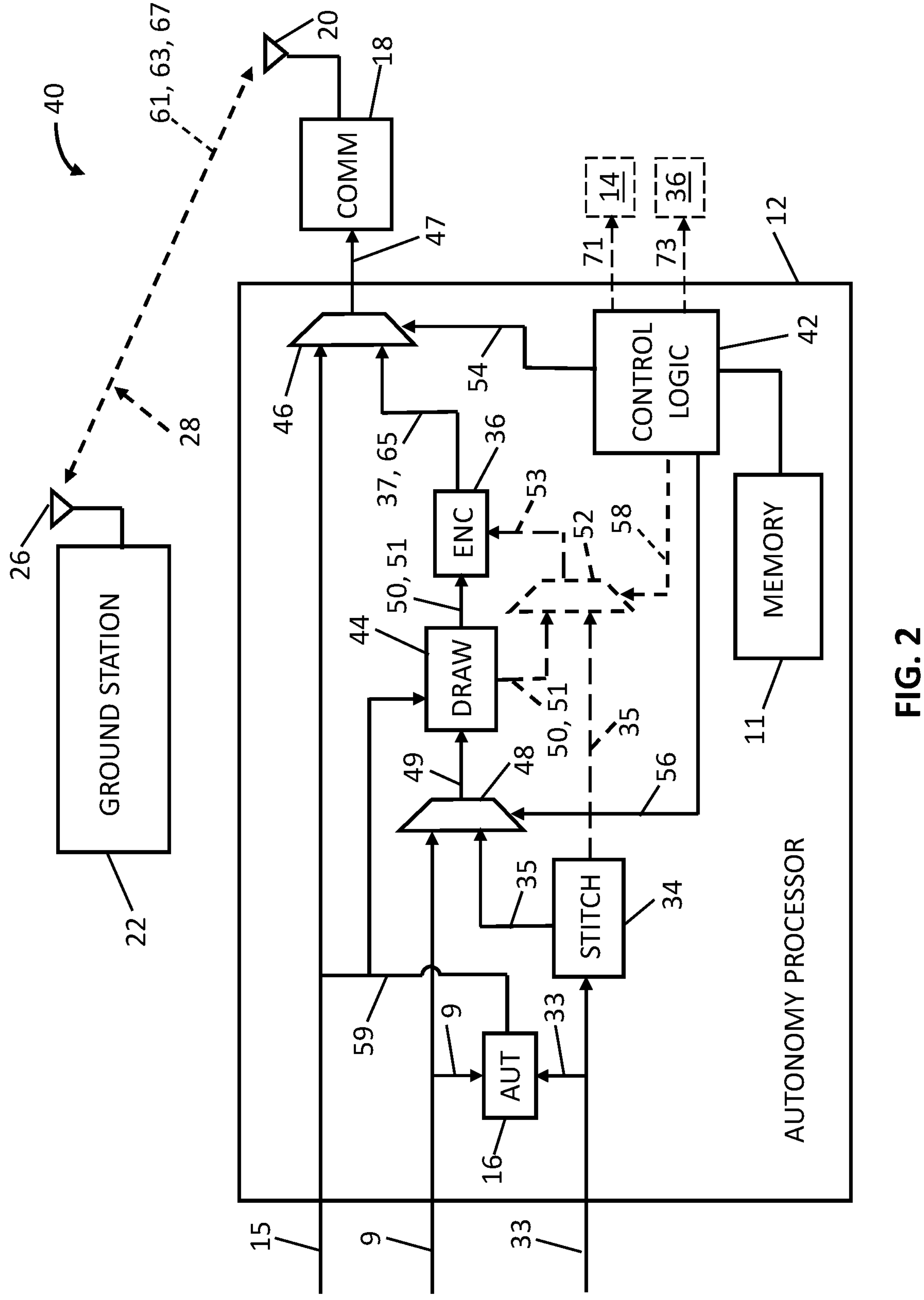
FIG. 2 depicts a block diagram of aspects of the UAV system of FIG. 1 in accordance with some embodiments.

FIG. 2 depicts a block diagram of aspects of a UAV system 40 including aspects of the UAV system of FIG. 1 in accordance with some embodiments. With reference back to FIG. 1 and its description above, UAV system 40 may include AP module 12 having additional components to enable additional useful and technically beneficial functionality as compared to system 1. AP module 12 of system 40 may include switch and control logic 42 circuitry. A first such switch may be embodied in a multiplexer 46 operably coupled in communication to and between communication interface 18 and ISP module 10. Multiplexer 46 may also be operably coupled in communication with encoder 36 of AP module 12.

AP module 12 of system 40 may also include a drawing module 44 operably coupled in communication with encoder 36, with encoder 36 downstream of drawing module 44 with respect to a direction of video data flow in system 40. In some embodiments, drawing module 44 may also be operably coupled in communication with autonomy module 16. Autonomy module 16 may receive YUV video stream(s) 9 and/or 33, process those video stream(s), and transmit a signal 59 encoding data representative of one or more annotations for use by drawing module 44 for drawing annotations on video stream(s) 9 and/or 33. As further described below, the aforementioned data encoded by signal 59 may be transmitted along with H.264 format video stream 15 to ground station 22 in cases where ground station 22 is capable of drawing annotations on the video for the benefit of user(s) of ground station 22.

Multiplexer 46 may be operably coupled in communication with control logic 42 to receive a switching control signal 54 therefrom. Multiplexer 46 may take as its inputs H.264 encoded video streams 15 (from encoder 14) and 37 (from encoder 36) and, depending on a state of multiplexer 46 under command of control logic 42, pass either video stream 15 or video stream 37, but not both, as a signal 47 to communication interface 18 for transmission to grounds station 22.

AP module 12 may include a second switch embodied in a multiplexer 48 operably coupled in communication with drawing module 44 on it downstream side, and with stitching module 34 and ISP module 10 on its upstream side. Multiplexer 48 may be operably coupled in communication with control logic 42 to receive a switching control signal 56 therefrom. Multiplexer 48 may take as its inputs YUV formatted video stream 9 (from camera sensor(s) 8 via ISP module 10) and stitched video stream 35 (from stitching module 34) and, depending on a state of multiplexer 48 under command of control logic 42, pass either video stream 9 or video stream 35, but not both, as a signal 49 to drawing module 44 for annotations to be drawn on the video frames of signal 49 prior to H.264 encoding by encoder 36 and subsequent transmission to ground station by way of communication interface 18.

Instead of, or in addition to, multiplexer 48, AP 12 of system 40 may include another switch embodied in a multiplexer 52 operably coupled in communication with stitching 34 and drawing 44 modules on its upstream side, and with encoder 36 on its downstream side. When present in AP module 12, multiplexer 52 may be operably coupled in communication with control logic 42 to receive switching control signal 58 therefrom. Multiplexer 52 may take as its inputs YUV formatted stitched video stream 35 (from stitching module 34) and annotated video stream 50, or annotated unencoded stitched video stream 51 (from drawing module 44) and, depending on a state of multiplexer 52 under command of control logic 42, pass either video stream 35 or video stream 50 (or 51), but not both, as a signal 53 to encoder 36 for H.264 encoding and subsequent transmission to ground station by way of communication interface 18.

Figure 3A:
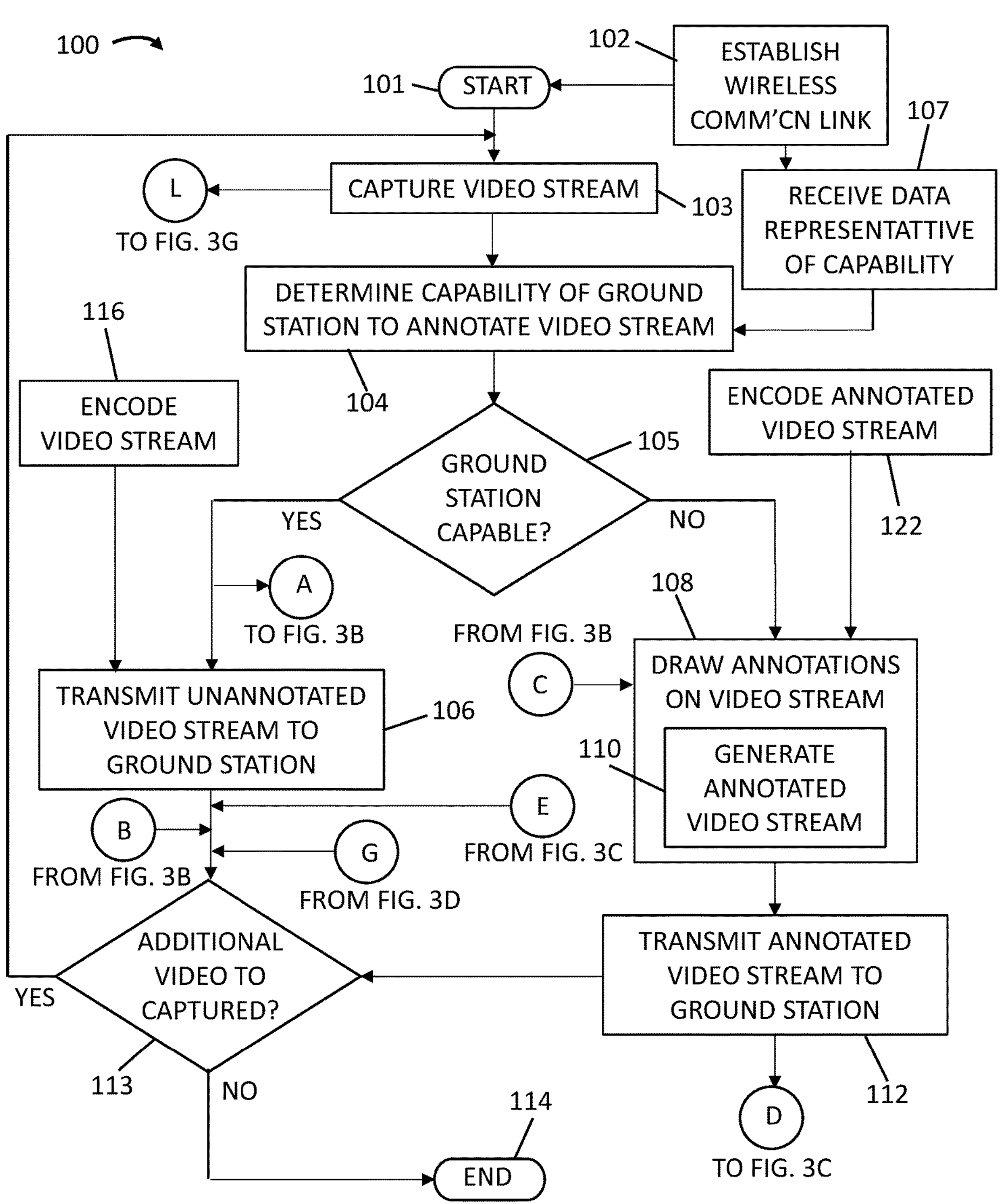
FIGS. 3A-3I depict flow charts of a method for operating the UAV system shown in FIGS. 1 and 2 in accordance with some embodiments.

FIGS. 3A-3I depict flow charts of a method 100 for operating the UAV system (e.g., system 40) shown in FIGS. 1 and 2 in accordance with some embodiments. Referring now to FIG. 3A, and with further reference back to FIGS. 1 and 2, and their description above, method 100 may commence from a start state 101. In an example, start state 101 may correspond to the UAV 2 being powered on following a period of being powered off or being in a sleep or other low power consumption mode of operation. In another example, method 100 may include the step of establishing 102 (e.g., using WiFi) communications link 28 between UAV 2 and ground station 22, and start state 101 may additionally, or instead, correspond to communications link 28 being effectively established.

Method 100 may include the step of capturing 103 a video stream (e.g., video stream 9) using the one or more camera sensors 8 of UAV 2. Method 100 may also include the step of determining 104, e.g., by control logic 42 or similarly capable computing device(s) of UAV 2, a capability of ground station 22 to annotate video stream (e.g., video stream 9). In one example, the capturing 103 step may be performed prior to the determining 104 step in method 100. In another example, the determining 104 step may be performed prior to the capturing 103 in method 100. In yet another example, the capturing 103 and determining 104 steps of method 100 may be performed concurrently in method 100.

In some embodiments, method 100 may also include the step of receiving 107, via communications link 28, data representative of a capability of ground station 22 to annotate video stream (e.g., video stream 9). In such embodiments, the receiving 107 step of method 100 may be performed after establishing 102 communications link 28, and the determining 104 step of method 100 may include determining the capability of ground station 22 to annotate video streams according to the aforementioned received 107 data representative of a capability of the ground station 22.

In other embodiments, the capability of ground station 22 to annotate video streams may be determined 104 in method 100 according to a manual input received by, for example, e.g., by control logic 42 or similarly capable computing device(s) of UAV 2, before UAV 2 disembarking on a flight, as by a switch accessible to the user on the UAV 2 hull, where such a switch enables selection of operational conditions for system 40 according to whether or not ground station 22 to be used for the flight is capable or incapable of annotating video streams.

As shown in FIG. 3A, the determining 104 step of method 100 may include a logical branch 105 whereby it is determined whether or not ground station 22 is capable of annotating video streams (e.g., video stream 9) received from UAV 2 via communication interface 18. In response to determining 104 that the ground station 22 is capable to annotate video streams, method 100 may include the step of transmitting 106 video stream (e.g., video stream 9) to ground station 22 without annotations.

In some embodiments, method 100 may also include the step of encoding 116, e.g., using encoder 14, video stream (e.g., video stream 9) in response to determining 104 that ground station 22 is capable to annotate video streams. In such embodiments, the transmitting 106 step of method 100 may include transmitting an encoded (e.g., H.264) video stream 15 to ground station 22. Alternatively, in response to determining 104 that ground station 22 is incapable to annotate video streams, method 100 may include the step of drawing 108 annotations on the video stream (e.g., video stream 9) to generate 110 an annotated video stream (e.g., annotated video stream 50 or 51). Further in response to determining 104 that ground station 22 is incapable to annotate video streams, method 100 may also include the step of transmitting 112 the annotated video stream to ground station 22.

In some embodiments, method 100 may also include the step of encoding 122, e.g., using encoder 36, video stream (e.g., video stream 50 or 51) in response to determining 104 that ground station 22 is incapable to annotate video streams. In such embodiments, the transmitting 112 step of method 100 may include transmitting an encoded (e.g., H.264) annotated video stream 37 to ground station 22.

Following performance of either the transmitting 106 or transmitting 112 step in method 100, the process may proceed to a logical branch 113, whereby UAV 2 system 40 may identify whether or not there is additional video to be captured, e.g., by camera sensor(s) 8, and processed according to the present technology. This identification in method 100 may include determining if additional video stream data is incoming to AP module 12. Where additional video to be captured is identified at logical branch 113, method 100 may proceed to iterate through the above described process starting at the capturing 103 and/or determining 104 steps. However, where no additional video to be captured is identified at logical branch 113, method 100 may instead proceed to an end state 114. In an example, where there is no additional video to be captured in method 100, electronics 4 or part of the above described components thereof, may enter a powered off or low power (e.g., sleep) mode for the end state 114. In another example, method 100 may proceed to the end state 114 by the action of a user of UAV 2, as in turning its power off.

Figure 3B:
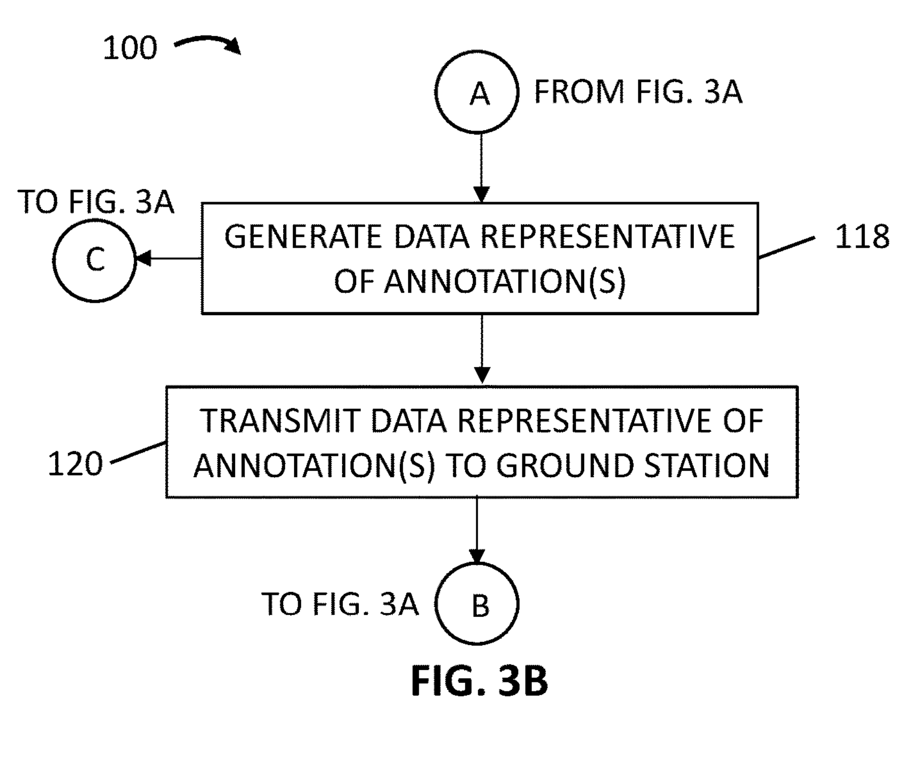

Referring now to FIG. 3B, and transitioning thereto from FIG. 3A from the circled letter "A," method 100 may include the step of generating 118, e.g., by autonomy module 16, signal 59 encoding data representative of one or more annotations. In one example, and as denoted by the transition from FIG. 3B back to FIG. 3A denoted by the circled letter "C," signal 59 may transmitted to drawing module 44 for use thereby for drawing annotations on video stream(s) 9 and/or 33 in response to determining 104 that ground station 22 is incapable of annotating video streams and thus requires video stream data to be transmitted to it with annotations already drawn using method 100. In this case, the method 100 step of drawing 108 annotations on, for instance, video stream 9 may include drawing the annotations on unencoded (e.g., YUV format) video stream 9 according to the data 59 representative of one or more annotations encoded by signal 59.

In another example, and further in response to determining 104 that ground station 22 is capable of annotating video streams, method 100 may include the step of transmitting 120 signal 59 to ground station 22 in addition to, or instead of, passing signal 59 to drawing module 44. In some embodiments, signal 59 may be transmitted to ground station 22 with, for example, unannotated H.264 encoded video stream 15 in response to determining 104 that ground station 22 is capable of annotating video streams. In this case, annotation data encoded by signal 59 may be utilized by, for example, UAV 2-related application software installed and running on a smartphone type ground station to draw annotations on, e.g., video stream 15 as desired by a user. Following performance of the transmitting 120 step in method 100, the process may transition from FIG. 3B back to FIG. 3A via the circled letter "B" and proceed to logical branch 113, as described above.

The present technology beneficially provides users of UAV 2 and/or ground station 22 to alternately enable and disable various functionality relating to streaming video from various sources on board UAV 2 (e.g., camera sensor(s) 8 and navigational cameras 32), as well as turning annotations on and off, including in cases where ground station 22 is incapable of annotating video streams transmitted to it from UAV 2. Requests for accomplishing such enabling and disabling of vide-related features and functionality may be referred to herein as toggling requests.

Figure 3C:
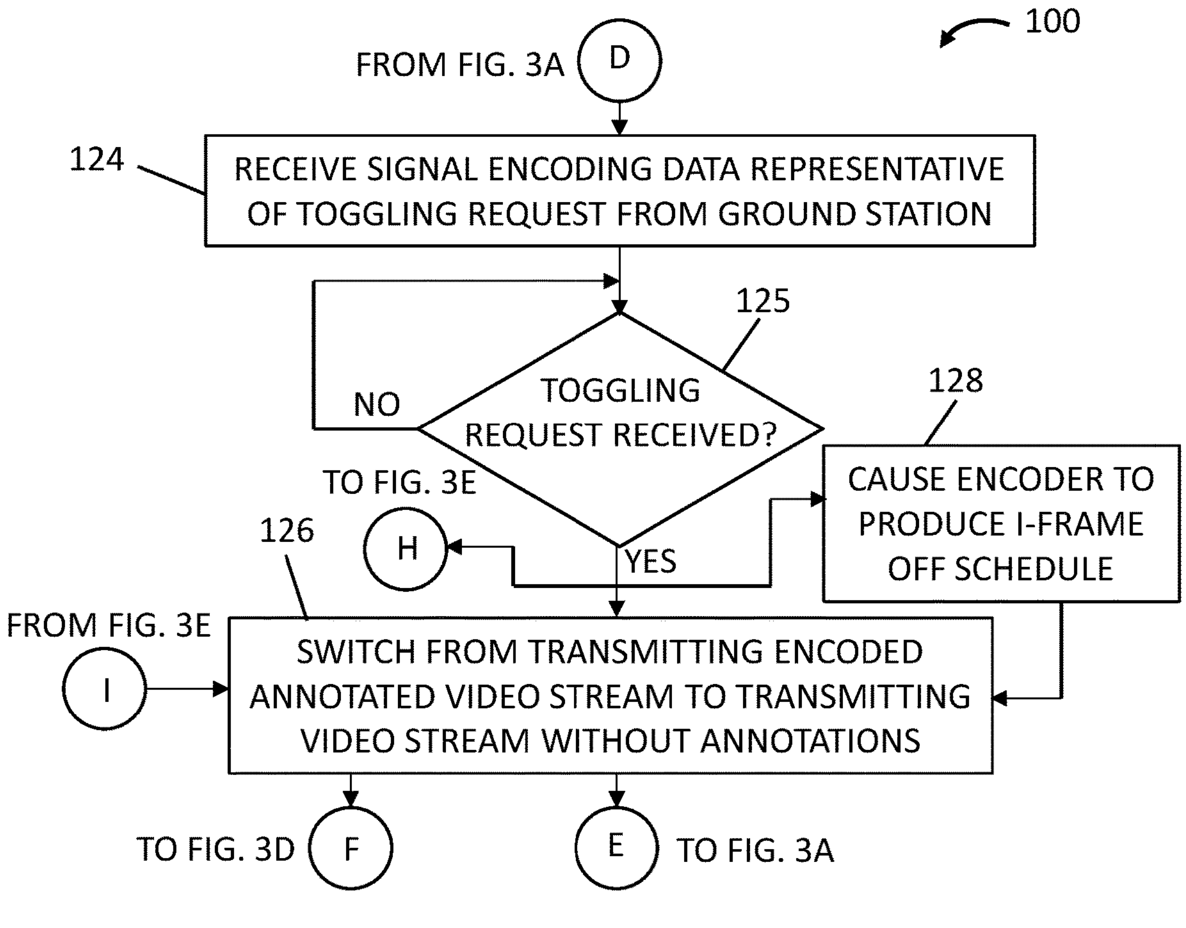

Referring now to FIG. 3C, and transitioning thereto from FIG. 3A from the circled letter "D," method 100 may include the step of receiving 124 a first signal 61 encoding data representative of a first toggling request from the ground station 22. In some embodiments, method 100 may proceed to a logical branch 125, whereby receipt 124 of first signal 61 may be identified. For receipt 124 of first signal 61 not being identified, method 100 may loop back to logical branch 125, including iteratively, as necessary. However, for receipt 124 of first signal 61 being identified, and in response thereto, method 100 may include the step of first switching 126, e.g., by control logic 42 sending control signal 54 to multiplexer 46, from transmitting 112 the encoded annotated video stream 37 to ground station 22 to transmitting 106 the video stream 9 to the ground station 22 without annotations.

Video encoders that may be utilized in the systems and methods according to the present technology may take as inputs YUV format video streams and output respectively H.264 encoded video streams containing a plurality of I frames and a plurality of P frames, where there are more P frames produced by the encoders as compared to I frames. Encoders may produce I frames according to a predetermined and periodic schedule. When switching between two H.264 encoded video streams for transmission to a common recipient device, it is advantageous to time the switch so that the video stream to be switched to starts to be transmitted with an I frame. Doing so may help ensure continuity in rendering and display of video of a common scene (annotated vs. unannotated video of a common captured scene). A control scheme according to the present technology may enable encoders as used in method 100 with, e.g., system 40, to produce I frames off schedule so as to facilitate switching in a timely manner with little to no interruption in video rendering and display.

To this beneficial end, and further in response to receiving 124 first signal 61, method 100 may include the step of causing 128, e.g., by control logic 42, encoder 14 to produce an I-frame sooner, e.g., off schedule. In an example, control logic 42 may sense, e.g., during or after processing in logical branch 125, receipt 124 of the first signal 61, and transmit a control signal 71 to encoder 14 to command it to produce an I frame in the desired video stream 9 to the ground station 22 without annotations. Doing so in method 100 thereby reduces the latency between the ground station 22 user causing it to transmit first signal 61 and user enjoying the change in the video displayed to him or her on the display device 30. From the first switching 126 step, method 100 proceed to logical branch 113, transitioning from FIG. 3C back to FIG. 3A via the circled letter "E."

Figures 3D, 3E:
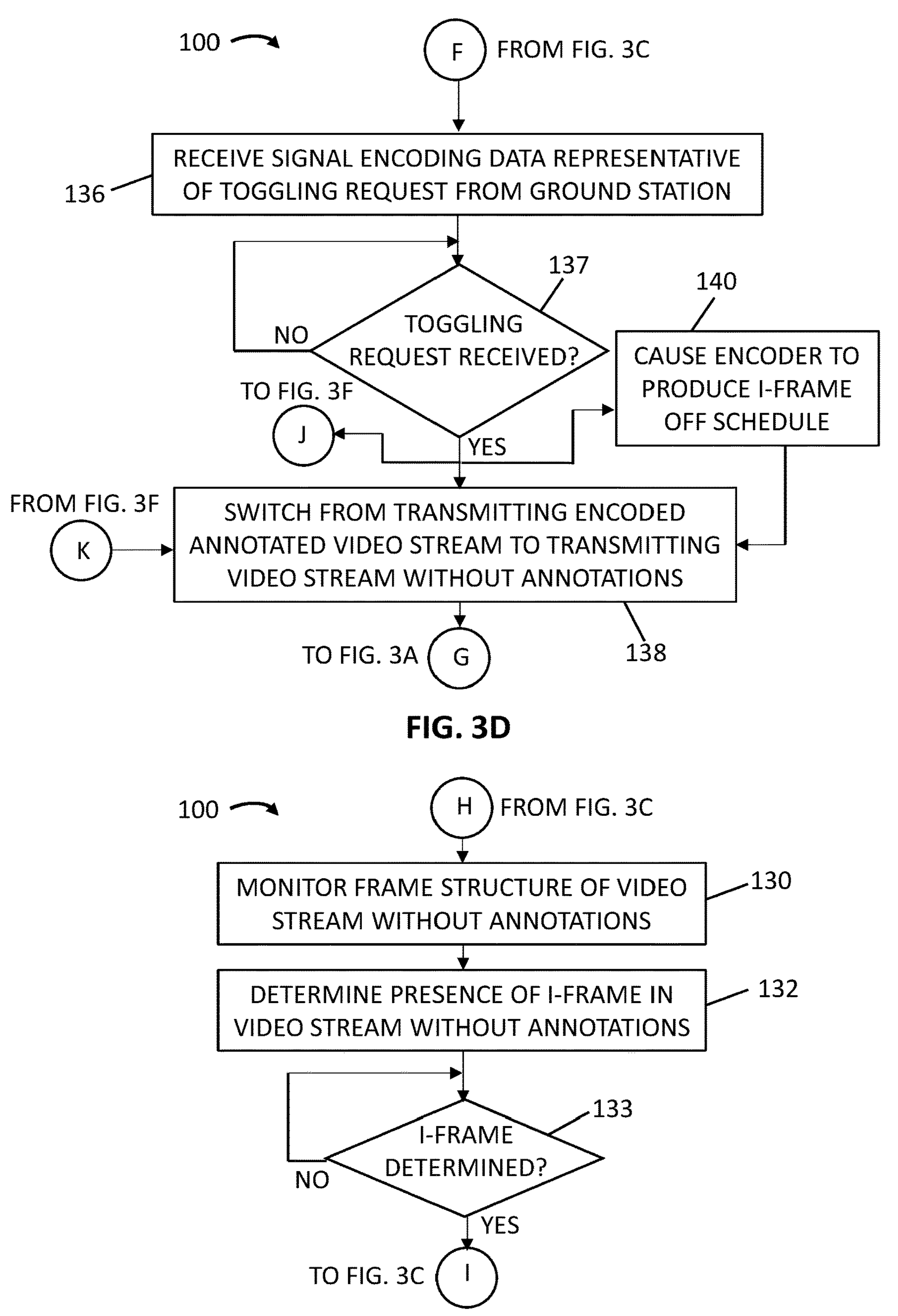

Referring now to FIG. 3E, and transitioning thereto from FIG. 3C from the circled letter "H," method 100 may include the step of monitoring 130 a frame structure of the desired video stream 9 without annotations further in response to receiving 124 first signal 61. In some embodiments, method 100 may also include the step of determining 132, based on the monitoring 130, a presence of the I-frame (e.g., a next I frame) in video stream 9 without annotations. In one example, encoder 14 may monitor 130 the aforementioned frame structure and determine 132 the presence of the I frame in video stream 9 without annotations. In the example, encoder 14 may, upon determining 132 the I frame, provide a responsive signal to control logic 42, thereby prompting it to pass control signal 54 to multiplexer 46 for the first switching 126. In another example, control logic 42 may monitor frame structure of video stream 9 without annotations. In that case, control logic 42 may, upon determining 132 the I frame, then send control signal 54 to multiplexer 46 to initiate the first switching 126 in method 100.

In some embodiments, method 100 may proceed from the determining 132 step to a logical branch 133, whereby I frame determination 132 may be identified. For identification of I frame not being determined 132, method 100 may loop back to logical branch 133, including iteratively, as necessary. However, for identification of I frame not being determined 132, and in response thereto, method 100 may proceed to the first switching 126 annotations upon determining 132 the presence of the I-frame in the video stream 9 without annotations, with the process transitioning from FIG. 3E back to FIG. 3C via the circled letter "I."

Referring now to FIG. 3D, and transitioning thereto from FIG. 3C from the circled letter "F," method 100 may include the step of receiving 136 a second signal 63 encoding data representative of a second toggling request from ground station 22. In some embodiments, method 100 may proceed to a logical branch 137, whereby receipt 136 of second signal 63 may be identified. For receipt 136 of second signal 63 not being identified, method 100 may loop back to logical branch 137, including iteratively, as necessary. However, for receipt 136 of second signal 63 being identified, and in response thereto, method 100 may include the step of second switching 138, e.g., by control logic 42 sending control signal 56 to multiplexer 48, transmitting 106 video stream 9 without annotations to ground station 22 to transmitting 112 encoded annotated video stream 37 to ground station 22.

To the beneficial end of continuity of video rendering and display to maintain a positive user experience, and further in response to receiving 136 second signal 63, method 100 may include the step of causing 140, e.g., by control logic 42, encoder 36 to produce an I-frame sooner, e.g., off schedule. In an example, control logic 42 may sense, e.g., during or after processing in logical branch 137, receipt 136 of the second signal 63, and transmit a control signal 73 to encoder 36 to command it to produce an I frame in the desired encoded annotated video stream 37. Doing so in method 100 thereby reduces the latency between the ground station 22 user causing it to transmit second signal 63 and user enjoying the change in the video displayed to him or her on the display device 30. From the second switching 138 step, method 100 proceed to logical branch 113, transitioning from FIG. 3D back to FIG. 3A via the circled letter "G."

Figures 3F, 3G:
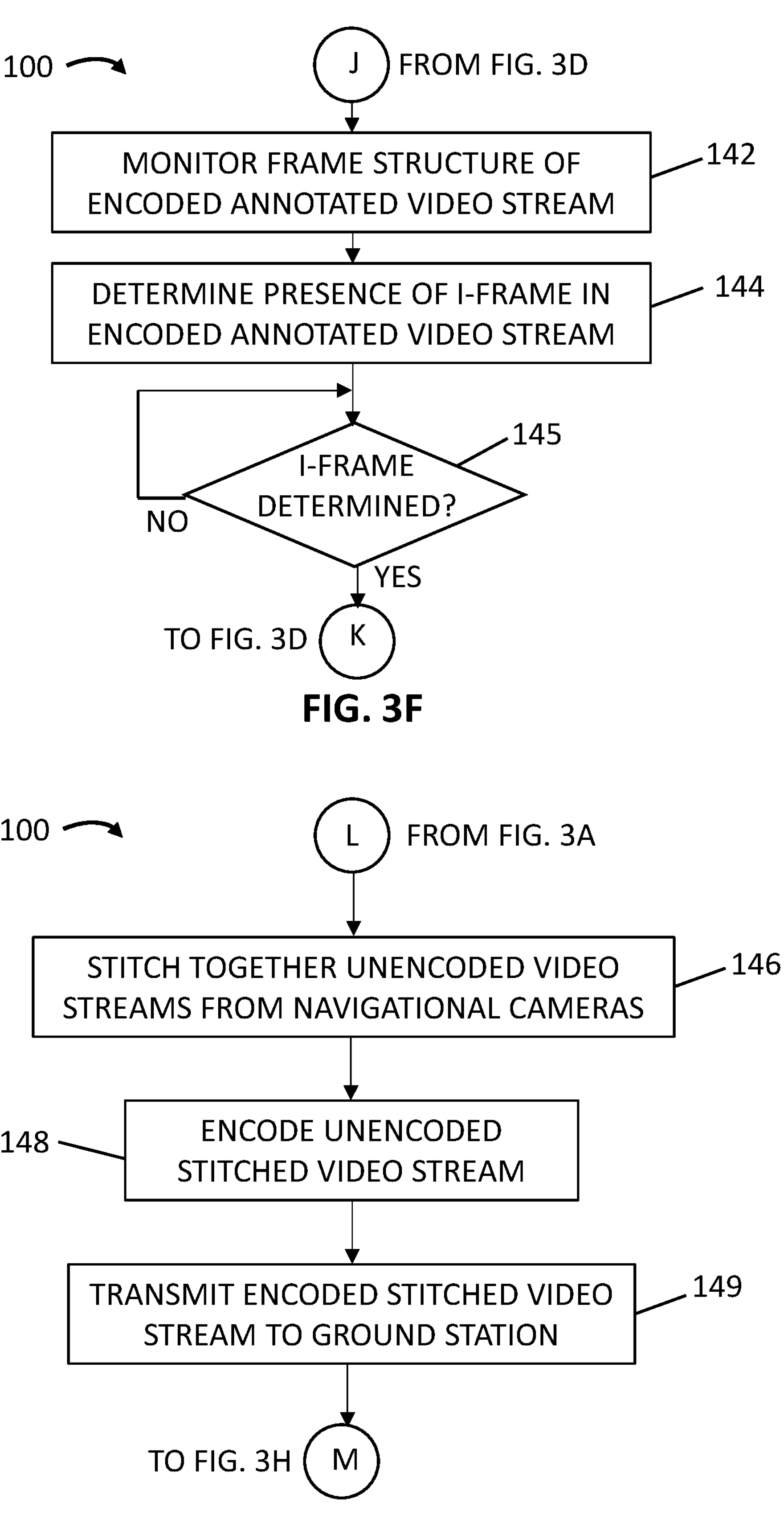

Referring now to FIG. 3F, and transitioning thereto from FIG. 3D from the circled letter "J," method 100 may include the step of monitoring 142 a frame structure of the desired encoded annotated video stream 37 further in response to receiving 136 second signal 63. In some embodiments, method 100 may also include the step of determining 144, based on the monitoring 142, a presence of the I-frame (e.g., a next I frame) in encoded annotated video stream 37. In one example, encoder 36 may monitor 142 the aforementioned frame structure and determine 144 the presence of the I frame in encoded annotated video stream 37. In the example, encoder 36 may, upon determining 144 the I frame, provide a responsive signal to control logic 42, thereby prompting it to pass control signal 56 to multiplexer 48 for the second switching 138. In another example, control logic 42 may monitor frame structure of encoded annotated video stream 37. In that case, control logic 42 may, upon determining 144 the I frame, then send control signal 56 to multiplexer 48 to initiate the second switching 138 in method 100.

In some embodiments, method 100 may proceed from the determining 144 step to a logical branch 145, whereby I frame determination 144 may be identified. For identification of I frame not being determined 144, method 100 may loop back to logical branch 145, including iteratively, as necessary. However, for identification of I frame being determined 144, and in response thereto, method 100 may proceed to the second switching 138 upon determining 144 the presence of the I-frame in the encoded annotated video stream 37, with the process transitioning from FIG. 3F back to FIG. 3D via the circled letter "K."

Referring now to FIG. 3G, and transitioning thereto from FIG. 3A from the circled letter "L," method 100 may include the step of stitching 146, e.g., by stitching module 34, respective unencoded video streams 33 from the plurality of navigational cameras 32 to produce an unencoded stitched video stream 35. Method 100 may also include the step of encoding 148, e.g., by encoder 36, the unencoded stitched video stream 35. Method 100 may further include transmitting 149, e.g., by communication interface 18, an encoded stitched video stream 65 to ground station 22. From the transmitting 149 step, method 100 proceed to logical branch 105, transitioning from FIG. 3G to FIG. 3H via the circled letter "M."

Figure 3H:
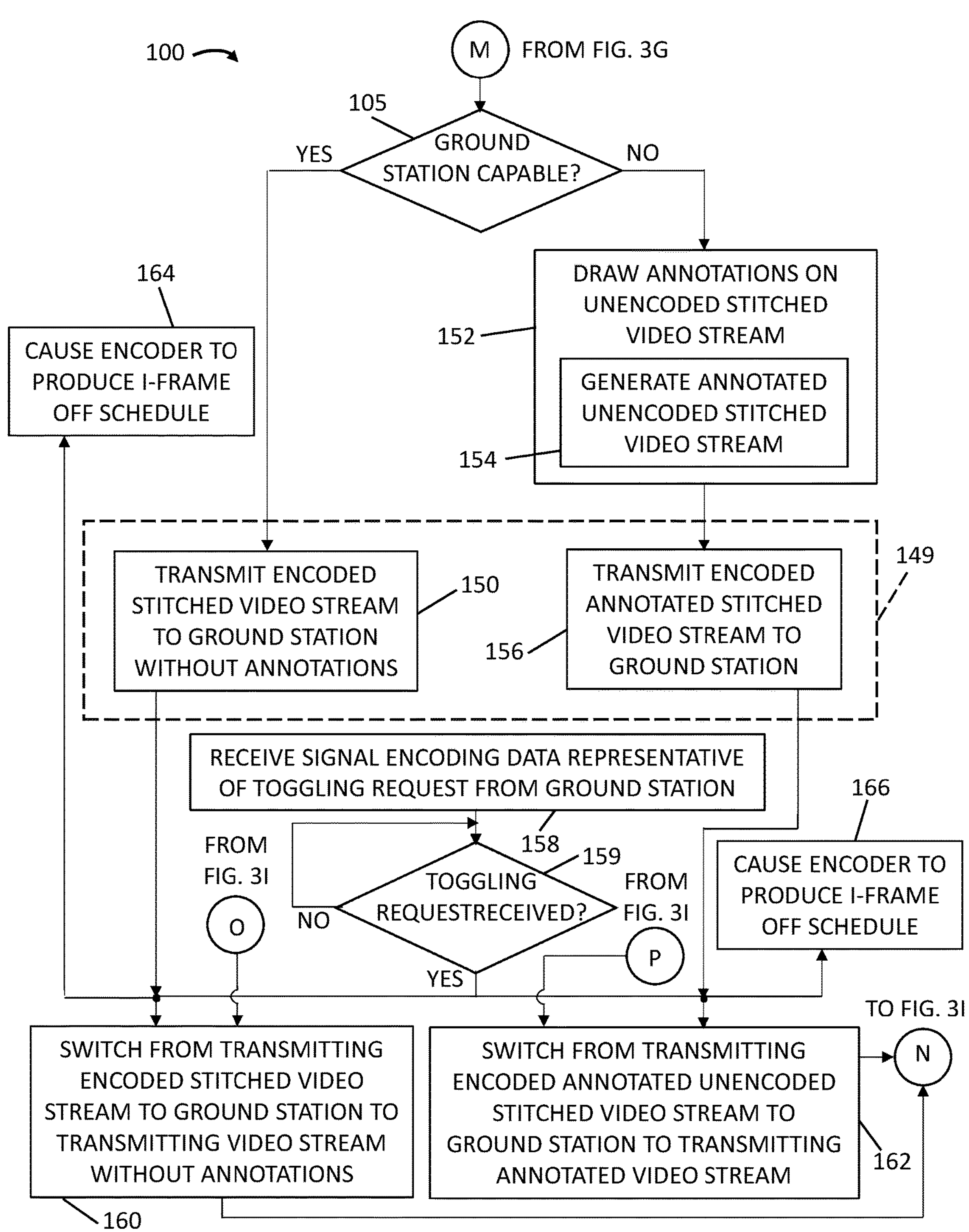

Referring now to FIG. 3H, and transitioning thereto from FIG. 3G from the circled letter "M," further in response to determining 104 that ground station 22 is capable to annotate video streams, transmitting 149 the encoded stitched video stream 65 may include transmitting 150 the encoded stitched video stream 65 to ground station 22 without annotations. Alternatively, further in response to determining 104 that ground station 22 is incapable to annotate video streams, method 100 may include the step of drawing 152 annotations on the unencoded stitched video stream 35 to generate 154 annotated unencoded stitched video stream 51. In that case, the method 100 step of encoding 148 the unencoded stitched video stream 35 may include encoding, e.g., using encoder 36, the annotated unencoded stitched video stream 51. Additionally in response to determining 104 that ground station 22 is incapable to annotate video streams, the method 100 step of transmitting 149 encoded stitched video stream 65 may include transmitting 156 an encoded annotated unencoded stitched video stream 51 to ground station 22 after performance of the drawing 152 step.

Still referring to FIG. 3H, method 100 may include the step of receiving 158 a third signal 67 encoding data representative of a third toggling request from ground station 22. In some embodiments, method 100 may proceed to a logical branch 159, whereby receipt 158 of third signal 67 may be identified. For receipt 158 of third signal 67 not being identified, method 100 may loop back to logical branch 159, including iteratively, as necessary. However, for receipt 158 of third signal 67 being identified, and further in response to determining 104 that ground station 22 is capable to annotate video streams, method 100 may include the step of third switching 160, e.g., by control logic 42 sending control signal 56 to multiplexer 48, from transmitting 150 encoded stitched video stream 65 to ground station 22 without annotations to transmitting 106 video stream 9 to ground station 22 without annotations.

To the beneficial end of continuity of video rendering and display to maintain a positive user experience, and further in response to receiving 158 third signal 67, method 100 may include the step of causing 164, e.g., by control logic 42, encoder 14 to produce an I-frame sooner, e.g., off schedule. In an example, control logic 42 may sense, e.g., during or after processing in logical branch 159, receipt 158 of the third signal 67, and transmit control signal 71 to encoder 14 to command it to produce an I frame in the desired video stream 9 without annotations. Doing so in method 100 thereby reduces the latency between the ground station 22 user causing it to transmit third signal 67 and user enjoying the change in the video displayed to him or her on the display device 30.

Figure 3I:
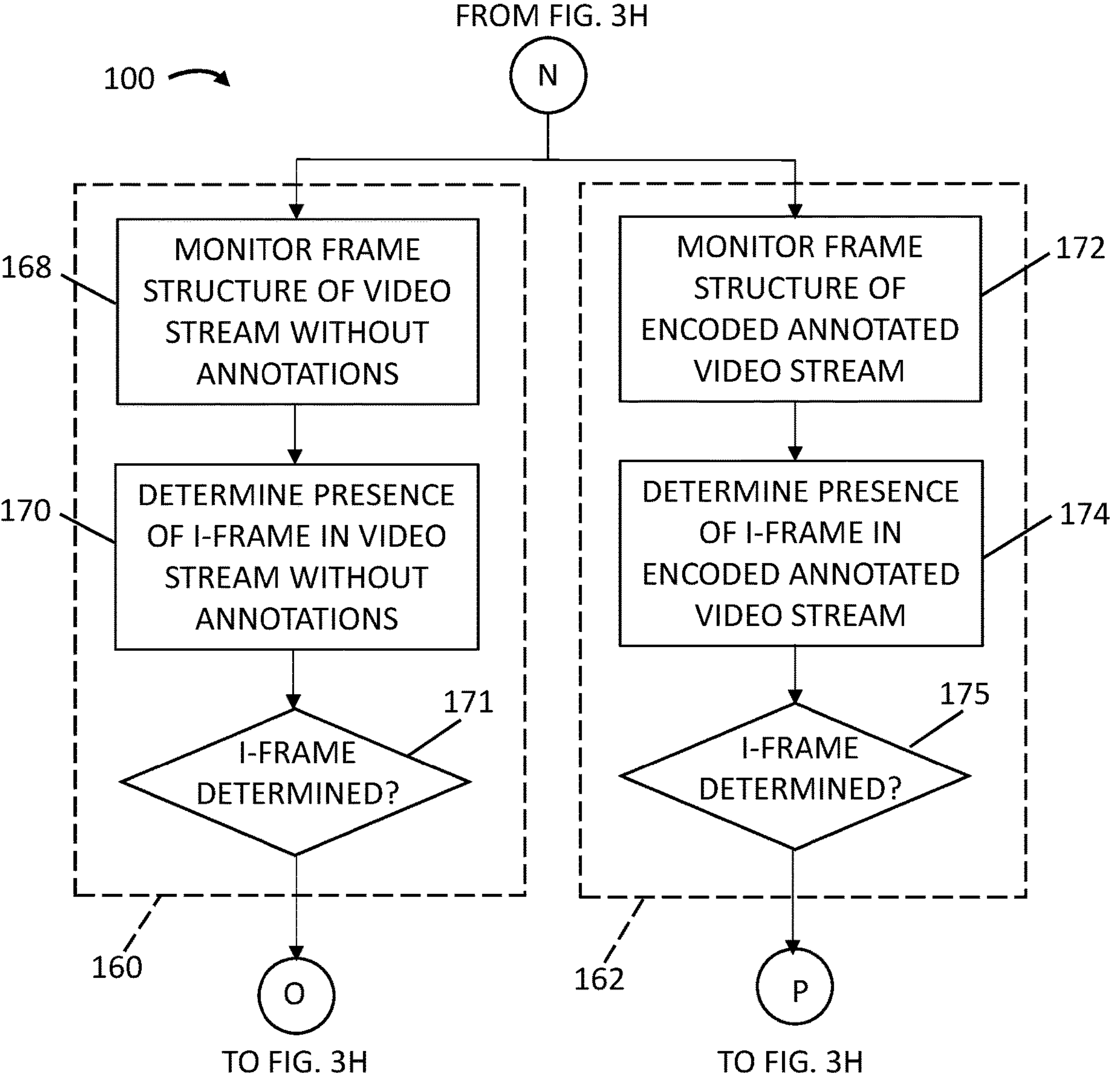

Referring now to FIG. 3I, and transitioning thereto from FIG. 3H from the circled letter "N," method 100 may include the step of monitoring 168 a frame structure of the desired video stream 9 without annotations further in response to receiving 158 third signal 67. In some embodiments, method 100 may also include the step of determining 170, based on the monitoring 168, a presence of the I-frame (e.g., a next I frame) in the unannotated video stream 9. In some embodiments, the third switching 160 step includes the monitoring 168 and determining 170 steps. In one example, encoder 14 may monitor 168 the aforementioned frame structure and determine 170 the presence of the I frame in H.264 encoded unannotated video stream 9. In the example, encoder 14 may, upon determining 168 the I frame, provide a responsive signal to control logic 42, thereby prompting it to pass control signal 56 to multiplexer 48 for the third switching 160. In another example, control logic 42 may monitor frame structure of unannotated video stream 9. In that case, control logic 42 may, upon determining 170 the I frame, then send control signal 56 to multiplexer 48 to initiate the third switching 160 in method 100.

In some embodiments, method 100 may proceed from the determining 170 step to a logical branch 171, whereby I frame determination 170 may be identified. For identification of I frame not being determined 170, method 100 may loop back to logical branch 171, including iteratively, as needed. However, for identification of I frame being determined 170, and in response thereto, method 100 may proceed to the third switching 160 upon determining 170 the presence of the I-frame in the unannotated video stream 9, with the process transitioning from FIG. 3I back to FIG. 3H via the circled letter "O."

Again referring to FIG. 3H, alternatively, for receipt 158 of third signal 67 being identified in logical branch 159, and further in response to determining 104 that ground station 22 is not capable to annotate video streams, method 100 may include the step of fourth switching 162, e.g., by control logic 42 sending control signal 56 to multiplexer 48, from transmitting 156 encoded annotated unencoded stitched video stream 51 to ground station 22 to transmitting 112 annotated video stream 50 to ground station 22.

To the beneficial end of continuity of video rendering and display to maintain a positive user experience, and further in response to receiving 158 third signal 67, method 100 may include the step of causing 166, e.g., by control logic 42, encoder 36 to produce an I-frame sooner, e.g., off schedule. In an example, control logic 42 may sense, e.g., during or after processing in logical branch 159, receipt 158 of the third signal 67, and transmit control signal 73 to encoder 36 to command it to produce an I frame in the desired annotated video stream 50. Doing so in method 100 thereby reduces the latency between the ground station 22 user causing it to transmit third signal 67 and user enjoying the change in the video displayed to him or her on the display device 30.

Referring again to FIG. 3I, and transitioning thereto from FIG. 3H from the circled letter "N," method 100 may include the step of monitoring 172 a frame structure of the desired annotated video stream 50 further in response to receiving 158 third signal 67. In some embodiments, method 100 may also include the step of determining 174, based on the monitoring 172, a presence of the I-frame (e.g., a next I frame) in the annotated video stream 50. In some embodiments, the fourth switching 162 step includes the monitoring 172 and determining 174 steps. In one example, encoder 36 may monitor 172 the aforementioned frame structure and determine 174 the presence of the I frame in annotated video stream 50. In the example, encoder 36 may, upon determining 174 the I frame, provide a responsive signal to control logic 42, thereby prompting it to pass control signal 56 to multiplexer 48 for the fourth switching 162. In another example, control logic 42 may monitor frame structure of annotated video stream 50. In that case, control logic 42 may, upon determining 174 the I frame, then send control signal 56 to multiplexer 48 to initiate the fourth switching 162 in method 100.

In some embodiments, method 100 may proceed from the determining 174 step to a logical branch 175, whereby I frame determination 174 may be identified. For identification of I frame not being determined 174, method 100 may loop back to logical branch 175, including iteratively, as needed. However, for identification of I frame being determined 174, and in response thereto, method 100 may proceed to the fourth switching 162 upon determining 174 the presence of the I-frame in the in annotated video stream 50, with the process transitioning from FIG. 3I back to FIG. 3H via the circled letter "P."

Figure 4:
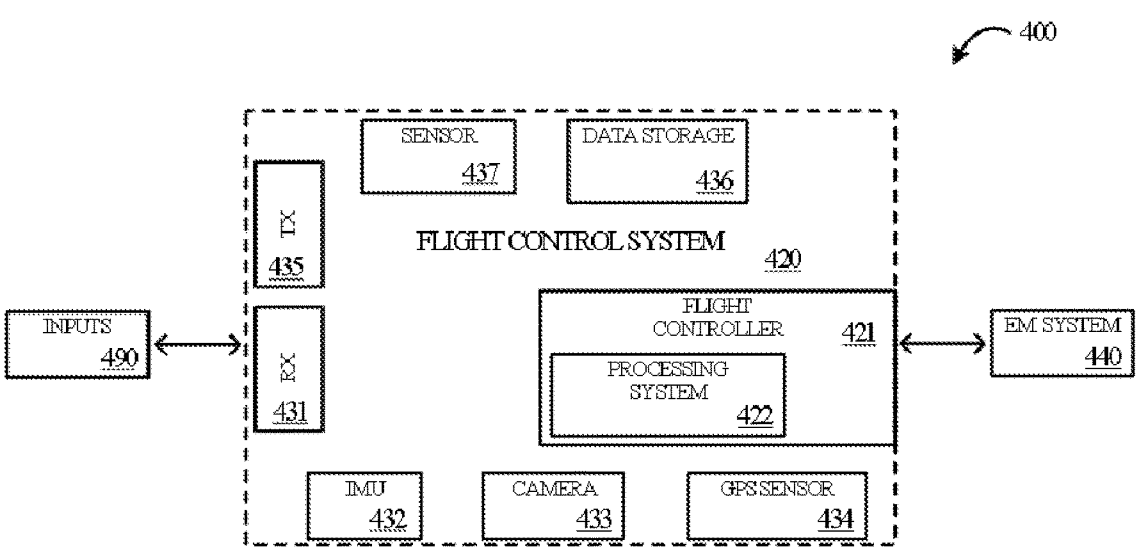
FIG. 4 depicts a systems architecture of a UAV in an implementation.

FIG. 4 depicts a systems architecture 400 of a UAV, such as UAV 2, in an implementation. Systems architecture 400 includes flight control system 420, electromechanical system 440, and operational inputs 490. Flight control system 420 comprises one or more receivers RX 431 for receiving operational inputs 490, such as wireless network communication or flight commands from a remote control device (e.g., ground station 22). Flight control system 420 further comprises flight controller 421, inertial measurement unit (IMU) 432, camera 433, GPS sensor 434, transmitter TX 435, and data storage 436. Data storage 436 includes persistent or nonvolatile memory or a removable memory card (e.g., an SD card) for recording flight and sensor data gathered from onboard devices, including photos or video captured by onboard cameras, or for storing programmed flight programs for use by the UAV. Flight control system 420 may also comprise one or more other sensors 437 such as barometers, altimeters, additional cameras, heat-detecting sensors, electromagnetic sensors (e.g., infrared or ultraviolet), compasses, anemometers or wind sensors, magnetometers, and so on. Onboard camera 433 comprises a device for capturing imaging data, such as video or still photography, across visible and other wavelengths of the electromagnetic spectrum, such as ultraviolet or infrared wavelengths.

Electromechanical system 440 provides the propulsion for the UAV, typically comprising an electronic speed controller which throttles one or more rotors according to flight instructions received from flight control system 420. It may be appreciated that both flight control system 420 and electromechanical system 440 can include other elements in addition to (or in place of) those disclosed herein, which are illustrated for exemplary purposes.

Figure 5:
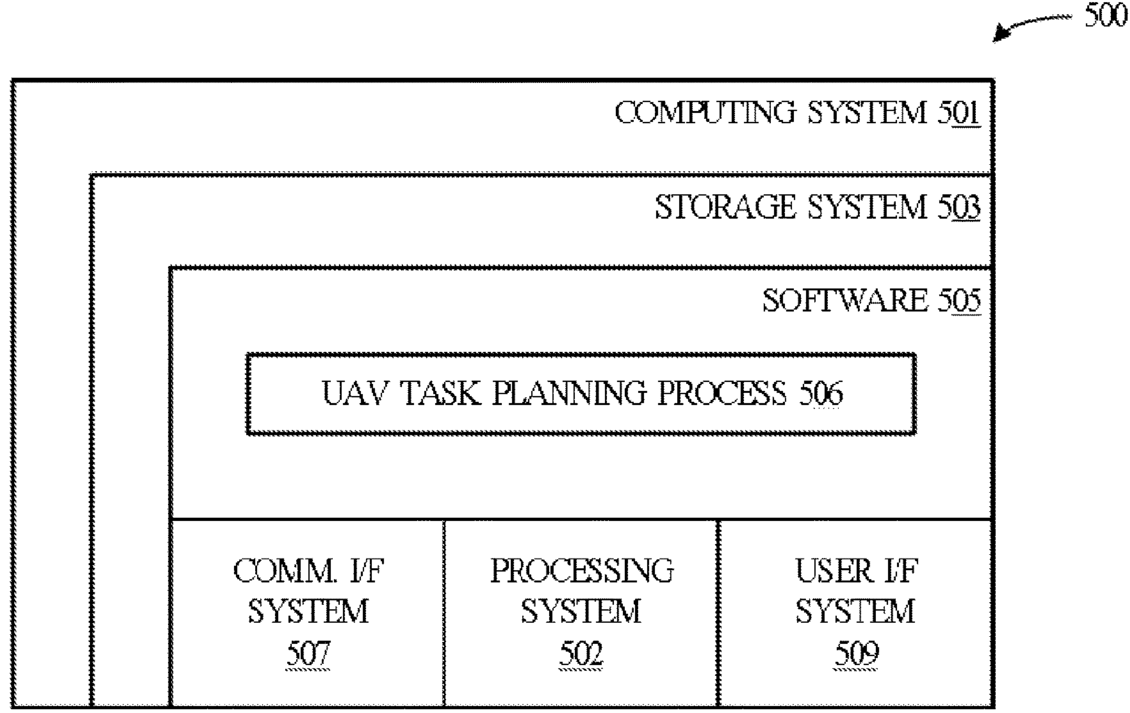
FIG. 5 depicts a block diagram of a computing system suitable for implementing the various operational environments, architectures, processes, scenarios, and sequences discussed below with respect to the other Figures.

FIG. 5 depicts a block diagram of a computing system 500 suitable for implementing the various operational environments, architectures, processes, scenarios, and sequences discussed below with respect to the other Figures. Computing system 500 may include a computing device 501 that is representative of any system or collection of systems in which the various processes, programs, services, and scenarios disclosed herein may be implemented. Examples of computing device 501 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 501 may be implemented as a single apparatus, system, or device or may be implemented in a distributed manner as multiple apparatuses, systems, or devices. Computing device 501 includes, but is not limited to, processing system 502, storage system 503, software 505, communication interface system 507, and user interface system 509 (optional). Processing system 502 is operatively coupled with storage system 503, communication interface system 507, and user interface system 509.

Processing system 502 loads and executes software 505 from storage system 503. Software 505 includes and implements task planning process 506, which is representative of the UAV-related processes described above according to the present technology with respect to the preceding Figures, such as method 100. When executed by processing system 502, software 505 directs processing system 502 to operate as described herein for at least the various processes, operational scenarios, and sequences discussed in the foregoing implementations. Computing device 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including UAV task planning process 506) may be implemented in program instructions and among other functions may, when executed by processing system 502, direct processing system 502 to operate as described with respect to the various operational scenarios, sequences, and processes illustrated herein. For example, software 505 may include program instructions for implementing the UAV task planning processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing device 501 is representative) overall from a general-purpose computing system into a special-purpose computing system customized to support sensor device deployments and swaps. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary, etc.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 501 and other computing systems (e.g., ground station 22), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology may be presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an unmanned aerial vehicle (UAV) having one or more camera sensors, the method comprising:

capturing a video stream using the one or more camera sensors of the UAV;

determining a capability of a ground station communicably coupled to the UAV to annotate the video stream; and in response to determining that the ground station is capable to annotate the video stream, transmitting the video stream to the ground station without annotations;

in response to determining that the ground station is incapable to annotate the video stream, drawing annotations on the video stream to generate an annotated video stream;

encoding the annotated video stream;

transmitting the encoded annotated video stream to the ground station; and receiving a first signal encoding data representative of a first toggling request from the ground station and responsively switching from transmitting the encoded annotated video stream to transmitting the video stream without annotations to the ground station.

2. The method of claim 1, further comprising:

establishing a communications link between the UAV and the ground station; and receiving, via the communications link, data representative of a capability of the ground station to annotate the video stream, wherein determining the capability of the ground station to annotate the video stream includes determining the capability of the ground station according to the data representative of a capability of the ground station to annotate the video stream.

3. The method of claim 1, further comprising:

encoding the video stream further in responsive to determining that the ground station is capable to annotate the video stream, wherein transmitting the video stream to the ground station without annotations includes transmitting the encoded video stream to the ground station.

4. The method of claim 1, further comprising:

generating data representative of one or more annotations for the video stream; and transmitting the data representative of one or more annotations to the ground station further in response to determining that the ground station is capable to annotate the video stream;

wherein drawing annotations on the video stream includes drawing the annotations on an unencoded video stream according to the data representative of one or more annotations.

5. The method of claim 1, wherein transmitting the video stream and the encoded annotated video stream to the ground station comprises establishing a wireless communication link between the UAV and the ground station and communicating with the ground station via the communication link in accordance with a communications protocol including a Bluetooth protocol or a WiFi protocol.

6. The method of claim 1, wherein responsively switching comprises controlling a multiplexer of the UAV to select, for transmission to the ground station, one of the encoded annotated video stream and the video stream without annotations.

7. The method of claim 6, further comprising:

causing an encoder to produce an I-frame in the video stream without annotations off schedule further in response to receiving the first signal.

8. The method of claim 6, further comprising:

further in response to receiving the first signal, monitoring a frame structure of the video stream without annotations; and determining, based on the monitoring, a presence of an I-frame in the video stream without annotations.

9. The method of claim 8, wherein the first switching comprises switching from transmitting the encoded annotated video stream to the ground station to transmitting the video stream to the ground station without annotations upon determining the presence of the I-frame in the video stream without annotations.

10. The method of claim 6, further comprising:

receiving a second signal encoding data representative of a second toggling request from the ground station; and in response to receiving the second signal, second switching from transmitting the video stream without annotations to the ground station to transmitting the encoded annotated video stream to the ground station.

11. The method of claim 10, further comprising:

causing an encoder to produce an I-frame in the encoded annotated video stream off schedule further in response to receiving the second signal.

12. The method of claim 10, wherein the second switching comprises:

further in response to receiving the second signal:

monitoring a frame structure of the encoded annotated video stream; and determining, based on the monitoring, a presence of an I-frame in the encoded annotated video stream, wherein the second switching comprises switching from transmitting the video stream without annotations to the ground station to transmitting the encoded annotated video stream to the ground station upon determining the presence of the I-frame in the encoded annotated video stream.

13. A system for operating an unmanned aerial vehicle (UAV), the system comprising:

one or more camera sensors for capturing a video stream; and at least one computing device disposed onboard the UAV and operably coupled to the one or more camera sensors, the at least one computing device configured to:

determine a capability of a ground station communicably coupled with the UAV to annotate the video stream; and in response to the ground station being determined to be capable of annotating the video stream, cause the video stream to be transmitted to the ground station without annotations;

or in response to the ground station being determined to be incapable of annotating the video stream, draw annotations on the video stream to generate an annotated video stream;

encode the annotated video stream to generate an encoded annotated video stream;

cause the encoded annotated video stream to be transmitted to the ground station; and receive a first signal encoding data representative of a first toggling request from the ground station and responsively cause the video stream without annotations to be transmitted to the ground station.

14. One or more non-transitory computer readable media having stored thereon program instructions which, when executed by at least one processor, cause an unmanned aerial vehicle (UAV) to:

determine a capability of a ground station in communication with the UAV to annotate a video stream captured by one or more camera sensors of the UAV; and in response to the ground station being determined to be capable of annotating the video stream, direct a communications interface of or associated with the UAV to transmit the video stream to the ground station without annotations;

or in response to the ground station being determined to be incapable of annotating the video stream, draw annotations on the video stream to generate an annotated video stream;

encode the annotated video stream to generate an encoded annotated video stream;

direct the communications interface to transmit the encoded annotated video stream to the ground station; and receive a first signal encoding data representative of a first toggling request from the ground station and responsively direct the communications interface to switch from transmitting the encoded annotated video stream to transmitting the video stream without annotations to the ground station.

15. A method of operating an unmanned aerial vehicle (UAV) having one or more camera sensors, the method comprising:

capturing video streams using the one or more camera sensors of the UAV, wherein the one or more camera sensors include a plurality of navigational cameras;

stitching together the video streams from the plurality of navigational cameras to produce an unencoded stitched video stream;

determining a capability of a ground station communicably coupled to the UAV to annotate the unencoded stitched video stream; and in response to determining that the ground station is capable to annotate the unencoded stitched video stream, transmitting the unencoded stitched video stream to the ground station without annotations; and in response to determining that the ground station is incapable to annotate the unencoded stitched video stream, drawing annotations on the unencoded stitched video stream to generate an annotated unencoded stitched video stream; and transmitting the annotated unencoded stitched video stream to the ground station.

16. The method of claim 15, further comprising encoding the unencoded stitched video stream resulting in an encoded stitched video stream;

wherein transmitting the unencoded stitched video stream to the ground station comprises transmitting the encoded stitched video stream to the ground station without annotations further in response to determining that the ground station is capable to annotate the unencoded stitched video stream; and wherein transmitting the annotated unencoded stitched video stream to the ground station comprises transmitting an annotated encoded stitched video stream to the ground station responsive to encoding the annotated unencoded stitched video stream.

17. The method of claim 16, wherein the one or more camera sensors further include at least one imaging camera, the method further comprising:

receiving a third signal encoding data representative of a third toggling request from the ground station;

in response to receiving the third signal, and further in response to determining that the ground station is capable to annotate the unencoded stitched video stream, third switching from transmitting the annotated encoded stitched video stream to the ground station without annotations to transmitting a video stream captured by the at least one imaging camera to the ground station without annotations; and in response to receiving the third signal, and further in response to determining that the ground station is incapable to annotate the unencoded stitched video stream, fourth switching from transmitting the annotated encoded stitched video stream to the ground station to transmitting an annotated version of the video stream captured by the at least one imaging camera to the ground station.

18. The method of claim 17, further comprising:

further in response to receiving the third signal, and further in response to determining that the ground station is capable to annotate the unencoded stitched video stream, causing an encoder to produce an I-frame in the encoded stitched video stream without annotations off schedule; or further in response to determining that the ground station is incapable to annotate the unencoded stitched video stream, causing an encoder to produce an I-frame in the annotated encoded stitched video stream off schedule.

19. The method of claim 17, wherein, further in response to receiving the third signal:

the third switching comprises:

monitoring a frame structure of the encoded stitched video stream without annotations; and determining, based on the monitoring, a presence of an I-frame in the encoded stitched video stream without annotations; and the fourth switching comprises:

monitoring a frame structure of the annotated encoded stitched video stream; and determining, based on the monitoring, a presence of an I-frame in the annotated encoded stitched video stream.

20. The method of claim 19, wherein:

the third switching further comprises switching from transmitting the encoded stitched video stream to the ground station without annotations to transmitting the video stream captured by the at least one imaging camera to the ground station without annotations upon determining the presence of the I-frame; or the fourth switching further comprises switching from transmitting the annotated encoded stitched video stream to the ground station to transmitting the annotated version of the video stream captured by at the least one imaging camera to the ground station upon determining the presence of the I-frame.

* * * * *